United States Patent

[11] 3,603,397

| [72] | Inventor | Jean-Marie Peray<br>Epinay, France |
|---|---|---|
| [21] | Appl. No. | 824,506 |
| [22] | Filed | May 14, 1969 |
| [45] | Patented | Sept. 7, 1971 |
| [73] | Assignee | W. R. Grace & Co.<br>New York, N.Y. |
| [32] | Priority | May 14, 1968 |
| [33] | | Great Britain |
| [31] | | 22947/68 |

[54] INTRINSIC MOBILITY CONTROL IN PETROLEUM RECOVERY
17 Claims, 1 Drawing Fig.

[52] U.S. Cl. .................................. 166/270,
166/256, 166/274, 166/295
[51] Int. Cl. .................................. E21b 33/138,
E21b 43/22
[50] Field of Search ........................... 166/275,
274, 273, 311, 295, 270, 300, 256

[56] References Cited
UNITED STATES PATENTS

| 3,039,529 | 6/1962 | McKennon | 166/275 |
| 3,208,518 | 9/1965 | Patton | 166/246 |
| 3,282,337 | 11/1966 | Pye | 166/275 |
| 3,305,019 | 2/1967 | Katzer | 166/311 X |
| 3,308,885 | 3/1967 | Sandiford | 166/295 |
| 3,370,649 | 2/1968 | Wogelmuth | 166/274 |
| 3,396,790 | 8/1968 | Eaton | 166/270 |
| 3,490,533 | 1/1970 | McLaughlin | 166/275 X |

Primary Examiner—Stephen J. Novosad
Attorney—Kenneth E. Prince

ABSTRACT: An improvement in the process of polymer flooding for the secondary recovery of crude oil or sometimes gas in which the polymer is formed underground from injected monomer and a polymer flood whose mobility shows a downward gradient towards the extraction well is provided. Agents for control of intrinsic mobility other than polymers may be formed; the creation of a mobility control agent capable of further change can be used for purposes other than flooding, such as plugging connate water or gas.

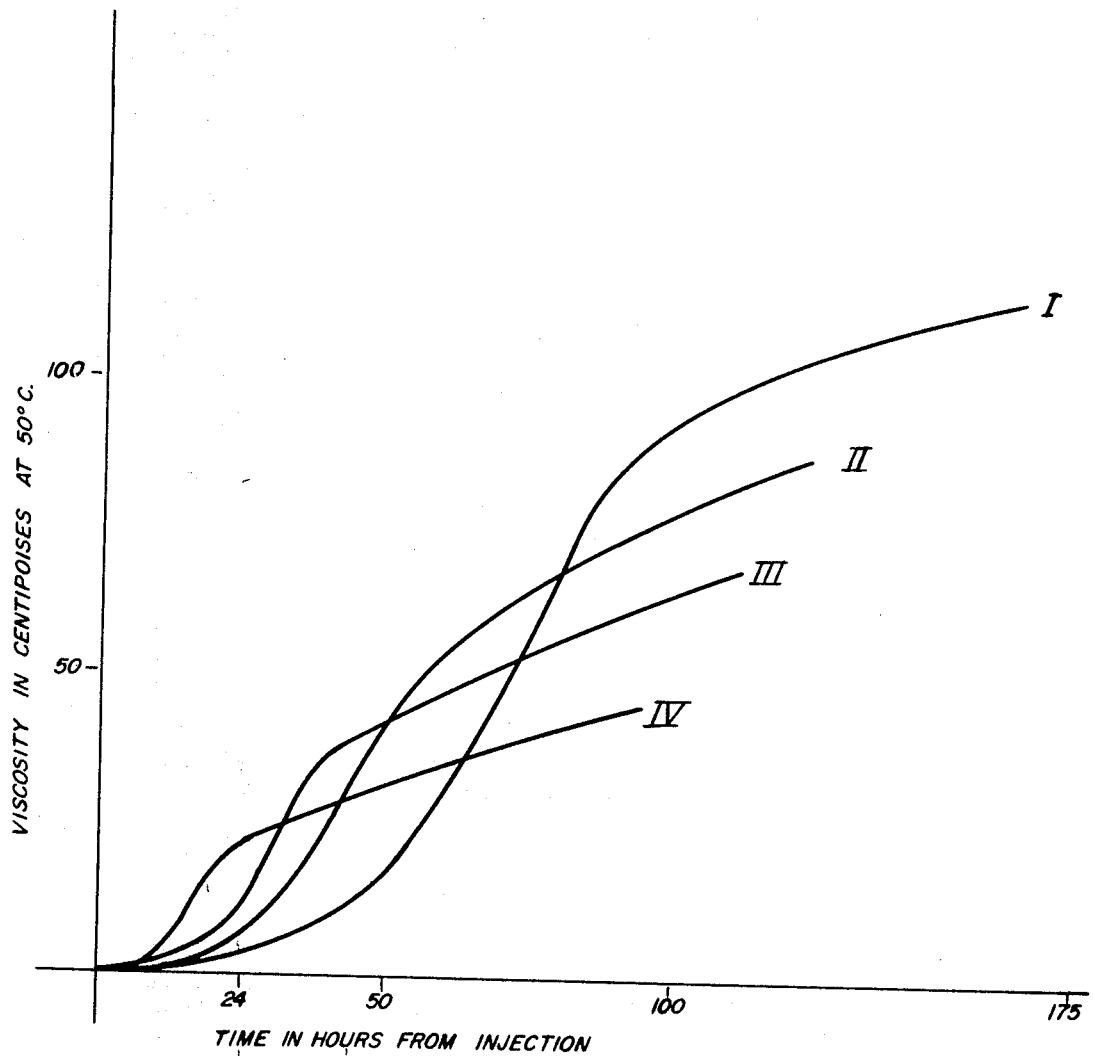

INTRINSIC MOBILITY CONTROL IN PETROLEUM RECOVERY

This invention relates to the recovery of petroleum fluid from a permeable geological formation. The invention relates especially to the recovery of crude oil, but relates also to the recovery of natural gas.

A problem that arises in the recovery of petroleum fluids—which the present invention is concerned to alleviate—is that together with the petroleum fluid there may be extracted from the ground an undesired other fluid.

In one aspect of this invention, the undesired fluid is a fluid of low economic importance naturally present in the formation, e.g. brine, or connate water segregated from the desired fluid or, when the desired fluid is oil, natural gas; it may even be that the desired fluid is an oil rich in valuable hydrocarbons while the undesired fluid is an oil of less economic importance, e.g. oil mixed with large quantities of connate water, or containing sulfur, or mixed with gas. Such undesired fluids may break through to the extraction well instead of or in addition to the desired fluids, and thus increase the cost of recovery of desired petroleum fluid.

There have been many prior proposals for restraining the flow of undesired fluid naturally present in the formation, by forming a plug within the formation. Such a plug is normally solid, and thus is unable to transmit the pressure of the undesired fluid to assist in driving the desired fluid; an example of this is when a natural water drive is plugged to prevent water coning. Water has been used as a plug to restrain flow of undesired gas, but is fairly easily displaced so that gas production is resumed within weeks or months. If undesired water or gas seeps past a plug formed by solidification, the plug can no longer change to block such seepage.

In an alternative aspect of the invention the undesired fluid is an oil-displacing medium or gas-displacing medium, that is to say, a fluid medium (nearly always liquid) introduced into the formation with the object of stimulating artificially the movement of oil or gas towards an extraction well. When the displacing medium is water, the process of extracting oil or gas with the aid of such injected water is called waterflooding.

A displacing medium tends to find its own path through the rock to an extraction well instead of stimulating flow of the desired fluid. Thus there may be extracted the undesired displacing medium and not the desired oil or gas. The tendency to premature extraction of displacing medium is more pronounced when the medium is more mobile than the fluid it is meat to displace; for example, in the case of water flooding for recovery of oil, the oil nearly always has a mobility lower than the mobility of water, so that flood water rather than oil reaches the extraction well.

It is known that the displacement factor, conformance factor and sweep efficiency of the displacing medium, or in short the oil production, can be improved by reducing the mobility of the oil-displacing medium.

Crude oil may in some cases be of higher mobility than the oil-displacing medium, and natural gas is of higher mobility than a gas-displacing medium, but even in these cases production of oil or gas can be improved by reducing the mobility of the oil- or gas-displacing medium.

The mobility of a liquid in a permeable geological formation is the effective permeability of the formation to that liquid divided by the viscosity of the liquid. Therefore a commonly adopted measure for reducing the mobility of a waterflood is to increase its viscosity.

The method of reducing the mobility of a waterflood which has found most favor during recent years is the method called "polymer flooding." In polymer flooding there is added to the water a polymer, for example a partially hydrolyzed polyacrylamide, and there results an aqueous polymer solution which is more viscous than water and which is introduced into the formation by being pumped down an injection well (normally down a set of injection wells).

Polymer flooding or other petroleum fluid displacing techniques are advantageous for the secondary recovery of crude oil (or gas), when the oil (or gas) reservoir has been partly depleted by primary extraction with the aid of the pressure naturally existing in the reservoir.

We have observed that a disadvantage of polymer flooding is that substantial hydraulic load losses are associated with flooding a viscous liquid at high linear speed. This is due to the fact that the major hydraulic load losses are suffered in the immediate surroundings of the injection well (where the linear flow speed is in the order of magnitude of meters per minute) whereas the place where decreased mobility is required is in the surroundings of the crude oil, remote from the injection well (where the linear speed of the flow is in the order of magnitude of decimeters per day).

The object of the present invention, broadly stated, is to provide an improved method of impeding the motion of an undesired fluid through a permeable petroliferous formation so as to increase the proportion of desired petroleum fluid extracted from the formation. A more specific object of the present invention is to provide a method of polymer flooding in which hydraulic load losses are less severe than hitherto. Another specific object of the invention is to provide a method of buffering brine or gas.

We have now found that these objects can be attained by providing within the geological formation a composition which is not fixed in its chemical nature but which can evolve in time or in response to a change in the subterranean conditions. Such a composition can be formed by subterranean reaction over an extended period of time. In particular we have discovered that it is possible and valuable to form a polymer by subterranean polymerization over a period of time so extended that an aqueous composition containing the earlier-formed polymer is more viscous that aqueous composition containing the later-formed polymer; in such a case the aqueous composition exhibits a mobility gradient, having a decrease in mobility in the direction of the extraction well.

Thus there is provided, according to the present invention, a method of recovering a petroleum fluid from a permeable geological formation comprising: (1) introducing into the formation a liquid medium containing a material capable of progressive reaction within the medium to form therewith a liquid composition of mobility lower than the mobility of said liquid medium, (2) effecting said reaction while the liquid medium is responsive to hydraulic forces over a period of time so extended as to provide in the geological formation a composition having a mobility which decreases in the direction of extractive flow towards an extraction well, and (3) extracting petroleum fluid through the extraction well whilst simultaneous extraction of undesired fluid is inhibited by the thickened composition.

The FIGURE illustrates the relationship of the increase of polymer viscosity with time after injection into a formation.

In this process, the petroleum fluid to be recovered is in the more important case crude oil but alternatively is natural gas. It will be appreciated that in practice, crude oil, gas, connate water or brine are not present in the formation or recovered therefrom as quite distinct fluids. Thus crude oil may be recovered as a mixture of oil and water or oil and gas, or gas may be recovered as a gas-rich oil.

In step (1) of the process, the liquid medium injected into the formation is nearly always water, though there may be conditions when use of an alternative liquid, e.g. a crude oil waste, is economically or technically attractive. The reactive material (which can of course be a mixture of two or more different chemical compounds) is nearly always a fluid—generally a liquid mixed with or preferably dissolved in the liquid medium though some gasses soluble in the liquid medium are available for this purpose. The reactive material on reaction forms with the liquid medium a liquid composition of relatively low mobility, that is, on reaction the reactive compound reduces the intrinsic mobility of the liquid medium, for example, the reactive compound may be a monomer which on reaction forms a polymer, so that the liquid composition which results from the reaction is an aqueous solution of the polymer.

The reactive material should be one which reacts progressively, so that nonidentical reaction products are formed at different stages of the reaction. For example, if the reactive material is a monomer then polymers of different molecular weights are formed at different stages of the process. Thus the liquid composition is "alive" and capable of change. It is important in this process that a composition of low intrinsic mobility be formed; it has previously been proposed to form underground a surface active agent which reduces the extrinsic mobility of a liquid containing it by its effect on surface tension and on the rocks, but for the programmed mobility gradient which is a feature of this invention reduction merely of the extrinsic mobility is not sufficient. A visco-elastic or thixotropic material would exhibit a mobility gradient according to its speed or flow, but not a gradient of intrinsic mobility.

The reactive compound is generally one which on reaction forms a thickening agent, so that there will be formed a liquid composition more viscous than the injected liquid medium. The thickening agent formation of which is preferred in the process of this invention is a polymer.

Step (2) of the process may be concurrent with step (1) so that the reaction proceeds while more reactive material is being introduced, and step (3) can then also be concurrent. Steps (1), (2) and (3) can however be successive.

In step (2) of the process, the reactive compound is reacted, and a viscous or otherwise mobility-reduced liquid composition is formed. The reaction, being progressive, is not effected all at once, but over an extended period of time. For example, when the liquid composition formed in step (2) is to be used as an oil-displacing medium and the reaction leads to an increase in viscosity, the reaction may be regulated so that there is an increase in increase in viscosity of the liquid medium up to 15 percent of the maximum achievable viscosity only after 4 hours, and an increase by 50 percent of the maximum achievable viscosity, within 15 days. During this extended period the liquid medium, or liquid composition being formed from the liquid medium, is responsive to hydraulic forces and thus either is a deformable mass or flows through the formation towards the extraction well. As the reaction progresses the mobility of the resultant composition decreases, and thus there is a continuous decrease in mobility (e.g. rise in viscosity) in the direction of extractive flow.

When in step (2) of the process there is formed an oil- or gas-displacing medium, the reactive material is introduced into the formation through an injection well. The direction of extraction flow is then the direction radially outwards from the injection well, towards an extraction well. In this case the extension of time is such that the reaction has at any one moment gone to degree of completion which is greater distances from the injection well. Thus there is achieved a graded reduction in mobility. The reaction may initially and when approaching completion proceed very slowly so that the rate of decrease in mobility is almost nil, but it is a feature of this invention that there should be exhibited in the liquid composition a mobility gradient, if, for example a polymer is being formed, the quantity or molecular weight of the polymer increases in a direction radially outwards from the injection well. It is possible to stop and restart the process so as to keep the liquid composition alive. For example, there can be included in a polymerizable reactive material an agent to poison the reaction at a predetermined molecular weight, and the terminating effect of such agent can subsequently be overcome by injection of a polymerization catalyst. The catalyst may diffuse through the composition.

In step (3) of the process, the effect of the lowering of mobility is used. When the invention is used in the secondary recovery of oil by flooding, the liquid composition promotes recovery of the oil to permit recovery of the oil from one or more extraction wells and at the same time recovery of the liquid composition itself is inhibited because the mobility ratio (mobility of oil:mobility of flood) is improved. When the invention is used for inhibiting the flow of undesired water or undesired gas, the liquid composition forms a slug which constitutes a dynamic buffer to the undesired fluid. Both in the case of flooding and in the case of plugging the fact that the liquid composition exhibits a mobility gradient makes it a more effective displacing medium or more effective plug than a uniform, nonreactive composition. When used as a flood the composition tends to be of lower mobility, or to become less mobile more rapidly, at just those locations where it shows signs of moving rapidly through the geological formation towards the extraction well; this phenomenon which we term "self-healing slug" is discussed in greater detail below.

When used as a buffer the liquid composition is a viscous but deformable mass. Movement of the petroleum fluid in the direction of extractive flow can thus bring about movement of portions of the mass which are still reactive. As the reaction then progresses further, the mobility of the composition again decreases, thus again impeding the flow of undesired fluid. Such further reaction can occur in direct proportion to time elapsed or can be brought about by contact between two interactive compounds, such as monomer and polymerization catalyst, in consequence of the deformation.

For plugging, it is advantageous to provide an aqueous composition whose viscosity builds up to a value from 100 to 300,000 times, e.g. of the order of magnitude $10^3$ to $10^4$ times, greater than that of the flow to be plugged. When the process of the present invention is applied to the secondary recovery of crude oil by flooding a permeable geological formation with an oil-driving liquid, a less viscous liquid composition is aimed at. While one aims at a composition having an intrinsic mobility substantially lower than that of water, a small decrease by a factor of even 1.2 may give an economically interesting improvement in oil recovery; generally a decrease in the order of 2 to 100 times, e.g. 15–75 times, in the mobility is sought.

Besides flooding and plugging, the concept of a mobility gradient formed underground in a liquid composition is valuable for other purposes in oil recovery. For example, the liquid composition can be used to permit restarting of the flame after flame breakthrough in the case of flame-driving.

The most important application of this invention is in flooding, so it will be convenient to describe various parameters of the process, and especially the preferred reactive compound which is injected, with reference to a flooding process. It must be appreciated however, that the parameters regarding the polymerizable compound, catalyst, purification, partial prepolymerization and ammoniation discussed below are valid also for the application of this invention to plugging or other uses.

The effect of the formation of the liquid composition of reduced mobility if preferably to form a thickened solution, especially a thickened aqueous solution. It should be borne in mind however that the behavior of the liquid composition when measured in a viscometer at the surface may be quite different from the behavior of the composition within the permeable geological formation, and that an agent which appears to be primarily a thickening agent may work underground also to lower the mobility by selectively lowering the permeability of the formation to water, thus additionally reducing mobility.

The preferred method of forming the liquid composition is to effect subterranean polymerization (including copolymerization) of one or more compounds present in the injected liquid medium. One alternative to polymerization is metamorphization by formation of a smectic or nematic compound. Another alternative is polycondensation, e.g. of polyethylene oxide with formal. That is, the reactive compound of step (1) should be a compound, e.g. a monomer, capable of being polymerized.

The monomer or other polymerizable compound included in the injected liquid medium is preferably one capable, on polymerization, of bringing about a substantial increase in the increase in the viscosity of the water whilst at quite small concentration. Thus the polymerizable compound, in a limited view, may be seen as one satisfying the two conditions (1) at a concentration as low as 1 percent, preferably as low as 0.1 percent, it can after having been reacted underground produce a decrease of intrinsic mobility which attains a reduction in mobility of at least 10 times and advantageously as much as 100 times, and (2) at said concentration it does not, before reaction underground, increase the viscosity of water to any significant extent, (e.g. by not more than 10 percent); the compound may even decrease viscosity before reaction. Moreover the monomer or other polymerizable compound should not be one which under normal conditions would lead to solidification, vitrification or gelation of its solution, and should be compatible with the conditions of the geological formation; it should not be destroyed nor precipitated by the rocks of the formation and its polymerization should not easily be blocked by chemical constituents of the formation. Also the polymer later formed must be stable and miscible in the liquid medium (e.g. water). Thus the compositions containing the formed polymer is susceptible to reduction in viscosity on being diluted with more of the liquid medium.

Suitable polymers which can be formed to provide delayed thickening in the process of this invention are polyepoxides, polyalcohols, and polyacids and their derivatives such as salts, esters, amines and amides. Especially preferred as polyacid derivatives are polyacrylates which selectively decrease water permeability and which when partially hydrolyzed are not prohibitively absorbed or adsorbed by rock. Thus the polymer which preferably is formed in the process of this invention is a partially hydrolyzed polyacrylamide (i.e. polyacrylamide itself or an analogue such as polymethacrylamide). For this polymer, the liquid medium must be water. There has previously been described a process for the recovery of oil which comprises injecting into a geological formation an aqueous solution of a partially hydrolyzed polyacrylamide, and the polymers formed according to the process of the present invention can be similar to those the injection of which has previously been described. It must be noted however that in the process of the present invention, the polymer is not injected as such into the formation but instead a precursor thereof is included in the injection water and is gradually polymerized underground.

Polymerization of the polymerizable compound can be brought about by a catalyst naturally present in the formation as a chemical constituent thereof. The process of the invention can be controlled however by introducing into the formation, before, during or after the introduction, of the polymerizable compound, a catalyst or trigger so chosen as to bring about polymerization only after injection of the solution of polymerizable compound. The catalyst can be a chemical compound or some other source of energy.

When the polymer to be formed is a polymer of an arcylic amide, it is as stated most suitably a partially hydrolyzed polyacrylamide or analogous polymer; preferably the degree of hydrolysis is the maximum which can be attained, with an appropriate safety factor, short of precipitation, bearing in mind that the lower the degree of hydrolysis the greater the adsorption of polymer by the rock. Thus the polymerizable compound included in the injection water is suitably a mixture of acrylamide, or analogue thereof, together with a proportion of acrylic acid, or analogue thereof. Salts of the acid may of course be used instead of the free acid. It is possible to use a compound which will give the appropriate acrylamide, e.g. a salt of an acrylamide or acrylonitrile. For such a system a suitably catalyst is a Redox system balanced to bring about formation of the polymer after a predetermined interval.

One factor affecting the choice of Redox catalyst is the temperature of the formation. For example the redox system could be a mixture of ammonium sulfite or ammonium metabisulfite balanced for a cool formation e.g. between 20° C. or less to 50° C. by hydrogen peroxide. For a medium temperature range formation e.g. 40° C. to 80° C., the balancing oxidizing agent could be ammonium persulfate For hot formations of e.g. 60° C. to 120° C., ammonium periodate or sodium persulfate are preferable, and an agent other than metabisulfate can be used.

The catalyst should of course be selected having regard to its catalyzing effect in vitro, and also having regard to the nature of the rock in which it is to be used and to the concentration desired for the polymer. It is desirable to check the choice of catalyst by experimental simulation of conditions in any given formation. Generally one aims at as low a concentration as possible commensurate with ensuring that the desired reaction takes place, in order to have the maximum delay before polymerization takes place.

Factors affecting the choice of concentration are the degree of thickening it is desired to achieve, bearing in mind that one must balance the maximum thickening short of solidification against the cost of the material, the minimum concentration needed for the polymerization to begin, and the need to avoid such heat of reaction as will cause an explosion. If the delayer subterranean thickening of this invention is to be used in polymer flooding, a minimum suitable concentration of acrylic monomers is during the first stage of injection of the monomer about 0.75 percent by weight of water, though in some cases it has been observed that the reaction is initiated with monomer concentrations as low as 0.03 percent (in those cases rock specific area was extremely high, exceeding 25,000 square centimeters per gram). Once the reaction has been initiated the monomer solution can be diluted to a lower concentration compatible with economic factors. For the flooding process it must be noted that, even though not essential, it is recommendable to alternate monomer flooding with a washout period with water containing no monomer in order to avoid premature formation of high polymer in the immediate surroundings of the well.

If the subterranean thickening of this invention is to be used in forming a plug of viscous water to form a barrier to undesired fluid then a substantially higher monomer concentration has to be achieved, in the range of 5 percent to 15 percent or more. In such a case it is preferred to separate in time the injection of one solution of monomer pulse reducing agent of the Redox system and another solution containing the oxidizing agent, which acts as a trigger to act only when it meets said one solution. In such a case concentrations of the triggering catalyst injected alone are brought up to a massive dose.

The catalyst is for convenience generally included in the aqueous solution of polymerizable compound. The nature and amount of catalyst is chosen so as to bring about polymerization after a desired delay, but if desired a chain-stopping agent may be included, e.g. a phenolic ester in an amount of about 0.5 percent by weight of the polymer.

Many oil-bearing geological formations contain constituents of the rock or of the water which can act as poisons, impeding or preventing or limiting polymerization. It may also be that the injected carrier fluid carries poisons. Examples of such poisons are arsenic, copper, copper salts and copper alloys, and sulfur present as mercaptan. We have found that the adverse effects of such poisons can be overcome by appropriate preliminary treatment of the aqueous solution of polymerizable compound. One suitable method of treatment is to splash liquid mercury through the solution prior to injection, the splashed mercury being recovered and purified by distillation for reuse. The quantity of mercury lost in this way is negligible—no more than proportional to the solubility of mercury in water.

Alternative antipoisoning agents which may be used, though they have been found less generally useful than mercury, are hemoglobin and chlorophyll. Ammoniation of the solution also tends to improve the molecular weight of the polymer, and is particularly advantageous in conjunction with mercury treatment.

When the thickening agent to be formed is a partially hydrolyzed polyacrylamide it is found advantageous to effect partial polymerization of a minor part of the monomer before injection. A small quantity, e.g. 1 percent of the monomer is suitably withdrawn from a flow line, aged (i.e. polymerized to form a prepolymer of low molecular weight) and returned to a flow line as "seed" for polymerization of the remaining monomer.

This later technique is advantageous in increasing the yield of reaction when about 1 percent is abstracted from the main flow and prepolymerized during one third of the time necessary to complete the first stage of reaction before being reincorporated in the main flow. (The first stage is completed in a relatively short time—12 to 120 hours—whereas the second stage which leads to an increase in viscosity about twice that obtained in the first stage takes several weeks).

One of the problems encountered in water-flooding is that the water can find channels or fingers through the rock towards the extraction well which the oil does not follow, and the consequent "fingerization" can lead to an earlier water breakthrough or to a less favorable water/oil ratio in the liquid extracted from the output well. Such fingers or preferential channels are the consequence of variation in permeability of the geological formation, resulting from a fault or other cause of uneven porosity. It has been found that when, in a process according to the present invention, there is injected an aqueous solution of a compound capable on reaction of reducing the mobility of the water, the problem of fingerization is greatly alleviated. It appears that a chromatographic enrichment in monomer and prepolymer of the water in the finger occurs, thus increasing the yield or molecular weight of polymer and so forming a self-sealing viscous slug; this tends to ensure that the water front is not rendered uneven at the finger. In particular, polymer of higher molecular weight is selectively retained in the finger or selectively formed in the finger and thus the viscosity of water in the finger is selectively increased. This selective evening of the waterfront in fingers does not take place in the immediate vicinity of the input well but rather because of the delayed polymerization, close to the waterfront.

By appropriate control of the rate of reaction and the position of injection, one can inject the reactive compound used in the present invention into connate water which forms a natural water drive, as an alternative to inclusion of the reactive compound in an injected water flood.

Thus flexibility in the catalyst system is advantageous. Alternative to the catalysts described above are oxidizing solutions such as hydrogen peroxide, perborates, persulfates, perchlorates, chromates, periodates, organic peracids or their derivatives such as peracetic acid; the above oxidizing compounds could be used along or balanced by a reducing material such as sodium sulfite, metabisulfide, phosphide, thiosulfite, phosphite, hydrogen sulfide or hydrazine (hydrate or salt). Several products could be added in order to modify the reaction speed: ferricyanides, hydroquinone or derivatives (methyl or dimethyl hydroquinone), even in controlled quantities, mercaptans and their derivatives as esters, chlorosulfonated methyl siloxanes, and copper salts.

It is advantageous to effect laboratory experiments on samples of rock drawn from the formation, using crude from the formation, under conditions simulating the conditions prevailing in the formation, before commencing injection of the polymerizable compound. In this way one can arrive at the most appropriate combination of controllable variables having regard to the fixed parameters of the formation. The results aimed at in fixing the combination of controllable variables are:

a. to delay any substantial increase in viscosity of the injected flooding solution until the solution has passed from the injection well into the rock and indeed into displacing contact with the oil; and b. to achieve after the desired delay the maximum increase in viscosity of the flooding solution compatible with cost and short of solidification—broadly speaking, one aims to attain a mobility as low as possible and preferably lower than the mobility of the oil being displaced.

The fixed parameters of which account must be taken in deciding the controllable variables are:

a. Temperature in the oil formation;
b. Chemical composition of the rock (e.g. limestone or sandstone), of the oil and of the brine;
c. "Poisons,"i.e. antipolymerization agents, present in the rock or brought by flood water;
d. Porosity, specific area and permeability of the rock;
e. Viscosity of the oil;
f. Nature of water flooded (brine and so on).

The controllable variables determined in the light of the fixed parameters are:

a. The nature of the polymerizable compound and the ratio of one monomer to another;
b. The nature of the catalyst and the proportion of catalyst to monomer;
c. The concentration of monomer in the injected solution;
d. Whether the catalyst is mixed with monomer at the well head or, by injection through a separate pipe, at the oil level or at spaced intervals of time;
e. Preliminary treatment (e.g. by contact with mercury) to overcome catalyst poisons;
f. pH, controllable by addition of ammonia;
g. the amount, if any, of prepolymer added as "seed."

One can test the working of a chosen composition on a rock core drawn from the formation and test the possible presence of poisons by taking samples of different rocks from the formation, mixing and grinding them, and examining polymerization results in the presence of the ground rock.

The precise method of working will vary between one oil field and another and even timing adjustments are possible between one well and another of the same oil field.

The temperature pressure and flow rate prevailing in the formation during the injection procedure can be continuously monitored, and the rate of injection and polymerization be controlled accordingly.

After an initial fairly high concentration, above the minimum necessary to initiate polymerization, the concentration of polymerizable compound may be lowered, either by introducing a less concentrated solution or by diluting the already-introduced solution with water containing no polymerizable compound. Thus the average concentration achieved during the flood can, without detracting from the efficiency of the process, be substantially lower than the minimum instantaneous concentration theoretically needed.

We give the next three Examples of our delayed polymerization:

EXAMPLE 1

| | |
|---|---|
| Location | Kirkhuk |
| Rock | dolomitic limestone with irisated dionite |
| Porosity | 13% |
| Permeability | average 180 millidarcies (10–3,000 md.) |
| Temperature of formation | 58° C. |
| Pressure | 160 bar |
| Oil viscosity | 87 centipoises at 58° C. |
| $H_2S$ | 0.8% |
| Brine | 11% pore volume (130 g./l.). |
| The following formulation was evolved as appropriate: | |
| Monomer | 83% acrylamide, 17percent acrylic acid |
| Catalyst | 1 part ammonium persulfate to 1.15 parts sodium metabisulfite (as 1% solution in water) |
| Catalyst/monomer Ratio | 0.65 —0.80 parts of 1 percent catalyst solution to 100 parts of monomer |
| Monomer concentration | 1.8 parts per hundred in aqueous solution reducing to 0.3 by dilution |
| pH | 8.5, by addition of ammonia |
| chain stopper | 0.5 % phenolic ester. |

This formulation was tested on a core of limestone taken from the formation, and after passage through the core for three weeks the effluent solution had a viscosity of 92 poises measured at 60° C. Mobility decreased by a factor of 154. Only a much smaller decrease in apparent mobility (determined from flow rate and pressure) was noted up to one week after start of the test, and after three weeks the decrease was twice that after one week and then constant.

EXAMPLE 2

| | |
|---|---|
| Location | Libya |
| Rock | Triassic limestone |
| Permeability | 1,300 millidarcies |
| Pore volume | 17% |
| Temperature at formation | 68° C. |
| Pressure | 158–180 bars |
| Oil viscosity | 17 centipoises |
| $H_2S$ | 1.5% |
| Brine total solids | 12% pore volume |
| in brine | 1.85 g./l. |
| Monomer | 18% acrylic acid, 82% acrylamide |
| Catalyst | sodium metabisulfite 1.00 ammonium persulfate 0.85 (as 1% solution in water) |
| Catalyst/monomer ratio | 0.6–1.4 of solution per hundred of monomer |
| Monomer concentration | 3.6% initial decreasing to 0.1% by underground dilution, % by weight of aqueous solution |
| pH | about 8.5. |

This formulation was pumped through the sample core to give a flow rate of a few millimeters per hour. After 3 weeks the effluent flood water, having displaced the oil from the core, had a viscosity of 16 cp. at 68° C. The mobility had decreased by a factor of 19 (whereas the change in viscosity was sufficient to account for a decrease in mobility by a factor of only 16 ).

EXAMPLE 3

| | |
|---|---|
| Location | North Africa |
| Rock | permian sandy breccia |
| Permeability | 750 millidarcies |
| Pore volume | 19% |
| Temperature of formation | 45°–55° C. |
| Pressure | 140–200 bars |
| Oil viscosity | 30 centipoises |
| $H_2S$ | 0.3 |
| Brine | 14% pore volume |
| Total solides in brine | 140 g./l. |
| Monomer | 13% acrylic acid, 87% acrylamide |
| Catalyst | sodium metabisulfite 31% ammonium persulfate 69% as 1% in water |
| Catalyst/monomer | 0.85–0.96% of catalyst solution by weight of monomer |
| Monomer concentration | 4.2% decreasing to 0.2 by underground dilution |
| Viscosity of effluent solution | 35 cp. after 3 weeks |
| Mobility ratio of effluent | 42 × decrease. |

Summarizing the invention described above insofar as it relates for formation of a displacing medium, the present invention may be defined as 1. introducing into the formation a mixture of water and a compound capable of polymerization in the water to form a composition thicker than water,
2. effecting said polymerization so as to provide within the formation an aqueous oil- or gas-driving composition which is thicker in the vicinity of the oil or gas than in the vicinity of the injection well,
3. displacing oil or gas towards an output well by means of said driving composition, and
4. extracting oil or gas from the output well.

Preferably the introduction of said mixture continues while previously formed liquid composition is displacing oil or gas. It is then advantageous that the polymerization product has a molecular weight not exceeding 25 million, preferably not exceeding 15 million.

The invention applies not only to flooding for the secondary recovery of oil, but applies also to the delayed formation of an agent for thickening a fluid such as water so that the thickened fluid acts as a viscous buffer to impede extraction of gas or connate water. When the thickening agent consists of two separate components, (e.g. first polymerizable component such as the mixture of an acrylamide and an acrylic acid whose use has already been described for polymer flooding and a second component which acts as a trigger or catalyst for polymerization of the first) the two components can with advantage be injected separately either in time or space.

Thus for providing an obstacle to naturally present unwanted fluid, e.g. gas, gas- or water-rich oil, or connate water, in a zone of higher permeability than the permeability of the zone containing desired petroleum fluid, the present invention provides the process of injecting into an extraction well a composition (such as one of the polymerizable mixtures described above) capable of undergoing progressive subterranean reaction to provide a viscous barrier, until said composition has penetrated the zone of higher permeability, and then resuming production of the petroleum fluid before the viscous barrier has formed in the less permeable zone. In this way the viscous barrier. e.g. the buffer of polymer, has time to form before the unwanted fluid had pushed the composition out of the pores.

There is thus formed a plug or buffer as a viscous mass which blocks, for example, gas, or gas-rich oil, so as to partly or completely prevent such undesired fluid from passing into an extraction well. This viscous mass, although static, can still move and so permits the pressure of such undesired fluid to be transmitted to the oil thus assisting in impelling the oil forward.

In the process of this invention a liquid composition of reduced mobility, but still reactive can be formed, and further reaction of the composition can then be brought about after a predetermined delay by contacting the reactive liquid composition with a reaction trigger. The reaction trigger may be a catalyst-rich medium introduced into the formation immediately after a monomer-rich medium, so that the catalyst diffuses through formed polymer and brings polymerization nearer to completion; alternatively the reaction trigger may be catalyst injected into the formation when a change in the flow pattern or the recovery pattern shows such injection to be necessary.

The process of this invention permits control of the speed of viscosity-increasing reaction; thus there may be introduced into the formation a material capable of predeterminately progressive reaction. This is best illustrated by the accompanying drawing, which is a graph plotting viscosity against time for four different concentrations of catalyst by weight of monomer. The monomer and catalyst were those described in Example 3. In the drawing, curve I shows results using 1.3 percent catalyst
curve II shows results using 2.0 percent catalyst
curve III shows results using 2.5 percent catalyst
curve IV shows results using 3.0 percent catalyst.

I claim:

1. A method of recovering a petroleum fluid from a permeable geological formation comprising:
    a. introducing into the formation an aqueous solution containing a polymerizable compound which has been treated with an antipoisoning agent,
    b. effecting polymerization over a prolonged period of time thereby providing in the geological formation a composition having a mobility which decreases in the direction of extractive flow towards an extraction well, and
    c. extracting petroleum fluid through the extraction well whilst simultaneous extraction of an undesired fluid is inhibited by the thickened composition.

2. A method as claimed in claim 1 wherein said antipoisoning agent is ammonia, said aqueous solution of the polymerizable compound being ammoniated prior to introduction into the formation.

3. A method as claimed in claim 2 in which ammonia is added to the aqueous solution in sufficient quantity to create in the aqueous solution a pH of 8.5.

4. A method as claimed in claim 1 wherein said antipoisoning agent is elemental mercury, said aqueous solution of the polymerizable compound being treated with elemental mercury prior to introduction into the formation.

5. A method as claimed in claim 1 in which said polymerizable compound is a mixture of an acrylamide and an ethylenically unsaturated acid, preferably an acrylic acid, copolymerizable with the acrylamide to form a partially hydrolyzed polyacrylamide.

6. A method as claimed in claim 1 wherein said aqueous solution contains a phenolic ester chain stopping agent.

7. A method of recovering a petroleum fluid from a permeable geological formation comprising:
   a. introducing into the formation an aqueous solution containing a polymerizable compound into which a minor portion of the polymerizable compound is partially polymerized and the resultant prepolymer of low molecular weight is included as seed in the solution of polymerizable material,
   b. effecting polymerization over a prolonged period of time thereby providing in the geological formation a composition having a mobility which decreases in the direction of extractive flow towards an extraction well, and
   c. extracting petroleum fluid through the extraction well whilst simultaneous extraction of an undesired fluid is inhibited by the thickened composition.

8. A method as claimed in claim 7 in which the polymerizable compound is a mixture of an acrylamide and an unsaturated acid copolymerizable with the acrylamide to provide a partially hydrolyzed polyacrylamide.

9. A method as claimed in claim 8 in which the acid is an acrylic acid.

10. A method as claimed in claim 9 in which the acrylamide is introduced in the form of an acrylamide-forming material selected from salts and acrylonitrile.

11. A method as claimed in claim 7 in which a polymerization catalyst is introduced into the geological formation.

12. A method as claimed in claim 11 in which an aqueous solution containing both the polymerizable compound and the polymerization catalyst is introduced into the geological formation.

13. A method as claimed in claim 7 in which the polymerization product develops a molecular weight not exceeding 25 million, preferably not exceeding 15 million.

14. A method as claimed in claim 7 wherein said aqueous solution contains a phenolic ester chain stopping agent.

15. A method of recovering a petroleum fluid from a permeable geological formation comprising:
   a. introducing into the formation an aqueous solution containing at least one component of a redox polymerization catalyst,
   b. introducing into the formation an aqueous solution of a polymerizable material and any remaining component of said redox catalyst,
   c. effecting polymerization of said polymerizable material over a prolonged period of time, thereby providing in a geological formation a composition of substantially decreased mobility, and
   d. extracting the petroleum fluid through the extraction well whilst simultaneous extraction of an undesired fluid is inhibited by the thickened composition.

16. A method as claimed in claim 15 wherein the total redox catalyst is introduced into the formation prior to the introduction of said polymerizable material.

17. A method as claimed in claim 15 wherein said polymerizable compound is a mixture of an acrylamide and an ethylenically unsaturated acid, preferably an acrylic acid.